United States Patent Office 3,330,550
Patented July 11, 1967

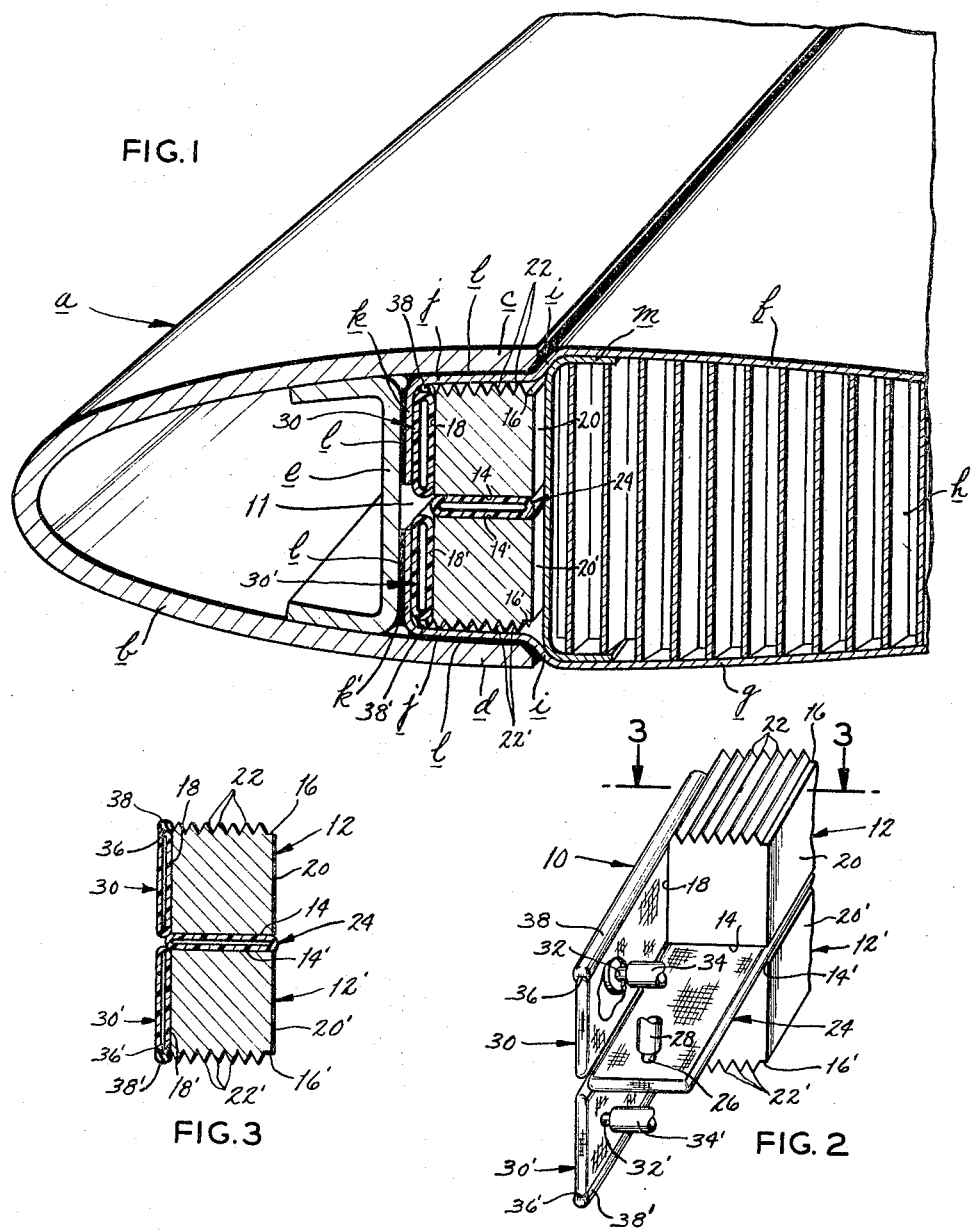

3,330,550
CLAMPING MANDREL FOR BONDING AND LIKE OPERATIONS
Winston E. Brownlee, Suttons Bay, Mich., assignor to Parsons Corporation, Traverse City, Mich., a corporation of Michigan
Filed Mar. 11, 1965, Ser. No. 438,919
3 Claims. (Cl. 269—22)

ABSTRACT OF THE DISCLOSURE

For use in applying internal pressure for bonding, a mandrel first expands outwardly to clamp itself in place and then expands forwardly to exert the bonding pressure. Two steel mandrel members have outwardly presented gripping surfaces. A flat inflatable pressure bag is adhered between them; second and third flat inflatable pressure bags are adhered onto their forward surfaces. After the first pressure bag is inflated to expand the mandrel members outward for secure gripping, the second and third bags are inflated to apply the bonding pressure forwardly.

---

The present invention relates generally to an expanding tool for applying internal pressures to structural members, and more particularly to a combination pressure-applying and clamping tool. A typical use, illustrated herein, is the bonding of helicopter rotor blade skins to a spar shear web, wherein the aft reaction of forwardly directed pressures is resisted by clamping to upper and lower margins, thus avoiding crushing of the low-density aft structure filler material.

In the fabrication of airfoils used as helicopter rotor blades wherein the aft structure must be light weight, inwardly bent forward margins of the upper and lower aft skins may be adhesively bonded to the spar reinforcing channel or shear web, as shown for example in U.S. Patent No. 2,884,078. Where the afterbody between the skins includes a low-density filler material, such as expanded-metal honeycomb, the use of typical expandable tools for applying bonding pressure forwardly to the inwardly bent margins of the skins is not feasible. The bonding pressures to be applied cannot be reacted by such filler material.

Therefore, among the objects of the present invention are the provisions of an expanding tool:
Which applies internal pressures to members to be bonded and simultaneously prevents reaction forces against delicate structural parts;
Which is readily insertable into and removable from structural members to be bonded by the application of internal pressure;
Which serves as a combination internal pressure-applying tool and a self-clamping tool; and
Which applies its bonding pressures evenly into inner corners of the structural members to be bonded.

These objects (and others apparent herein) are achieved generally by providing an expanding tool including two longitudinally-extending rigid mandrel members between which an inflatably dilatable tape-like pressure bag is positioned. The mandrel members are spacedly connected to each other by adhering one of their sides to the respective outer surfaces of the pressure bag. Each of the mandrel members is provided with a side having serrated surface portions. Upon inflation of the pressure bag coupling the two mandrel members together, the serrated surface portions thereof serve to fixedly clamp the expanding tool internally to structural members which are to be adhesively bonded. Upon evacuation of the pressure bag between the mandrel members, they are drawn together to facilitate removal of the expanding tool.

Utilization of the invention will become apparent to those skilled in the art from the disclosure made in the following description of the preferred embodiment of the invention as illustrated in the accompanying drawing in which:

FIG. 1 is a broken perspective sketch, partially in cross-section, of a helicopter rotor blade, an embodiment of the expanding tool of the present invention being shown inserted and inflated within the blade;

FIG. 2 is a partial perspective sketch of the expanding tool of FIG. 1 shown deflated and removed from the rotor blade; and FIG. 3 is a cross-sectional view of the expanding tool taken along the line 3—3 of FIG. 2

Referring now to the figures, wherein like reference characters designate like or corresponding parts throughout the several views, there is shown in FIG. 1 a helicopter rotor blade, generally designated $a$, which includes a metal spar $b$ and a light weight afterbody section, whose upper and lower aft sheet metal skins $f$ and $g$ are bonded to low-density filler material $h$. The spar $b$ includes a fairly rigid C-shaped shear web $e$ forward of upper and lower spanwise aft edges $c$ and $d$.

The upper and lower skins, $f$, $g$ have inward joggles $i$, $i'$ respectively toward their forward ends, which joggles permit the skins to tuck under the upper and lower spanwise aft edges $c$ and $d$ of the leading edge spar $b$. In this manner, margins $j$ and $j'$ just forward of the joggles $i$ and $i'$ may be presented for adhesion against the inner surfaces of the upper and lower spanwise aft edges $c$ and $d$. An appropriate adhesive, such as a heat curable rubber-base adhesive, may be coated on the forward margins $j$, $j'$ over the areas indicated as $l$ for bonding them to the spar $b$.

Forward of the margins $j$, $j'$ the afterbody skins $f$, $g$ extend inward at angles of approximately 90° to provide inward margins $k$, $k'$ respectively. These inward margins $k$, $k'$ are presented for bonding to the shear web $e$ of the spar $b$ by means of the adhesive seams $l$. Just aft of the inward joggles $i$, $i'$ of the afterbody skins $f$, $g$ there is provided an afterbody spacer channel $m$ over which the skins $f$, $g$ are addressed before tucking inward beneath the upper and lower aft edges $c$, $d$ of the spar $b$. The entire afterbody aft of the spacer channel $m$ is filled with a low-density filler material, such as the honeycomb material $h$.

In the fabrication of the present helicopter rotor blade, the filler material $h$, the afterbody spacer $m$, and the upper and lower aft skins $f$, $g$ are bonded together as a unit prior to being fitted against the spar $b$. Since the aft skins $f$, $g$ are preferably a light gage flexible metal, for bonding their forward margins $j$, $j'$ and inward margins $k$, $k'$ will have to be internally supported and pressed outward against the fairly rigid spar $b$. It becomes necessary, therefore, to provide a bonding pressure-applying tool which may be readily inserted within the cavity 11 defined by the forward margins $j$, $j'$, the inward bends $k$, $k'$, and the afterbody spacer channel $m$. Since the spacer channel $m$ is itself flexible and the filler material $h$ behind it is crushable, the further problem is presented—that such pressure-applying tool must not, in applying bonding pressure forward, impose an aft reaction force against the channel $m$.

The expanding tool 10 is shown inserted within this cavity 11 and inflated for clamping against the spar marings $c$ and $d$, as well as applying pressures to the critical bonding areas. When so expanded, the clamped tool 10 does not exert any force against the afterbody spacer $m$ or the low-density filler material $h$, but only against such bonding areas.

Referring now to FIGS. 2 and 3, it may be seen that the expanding tool 10 includes two longitudinally-extending rigid mandrel members 12, 12' which are positioned one above the other. Preferably these mandrel members 12 and 12' are solid aluminum bars; in the present embodiment they have approximately a one inch square cross-section and are of a length of approximately 20 feet. The upper mandrel member 12 and the lower mandrel member 12' have corresponding inner sides 14, and 14', outward-presented sides 16, 16', forward sides 18, 18' and aft sides 20, 20'. All of these sides, except the outward-presented sides 16 and 16', are substantially smooth and flat. The sides 16 and 16' have serrated or gripping surface portions 22 and 22' respectively, which with the mandrel members 12 and 12' aligned one on top of the other, project outwardly toward the upper and lower forward skin margins $j$, $j'$ within the spar aft edges $c$, $d$.

Between the upper mandrel member 12 and the lower mandrel member 12' there is provided a flat, tape-like inflatable pressure bag 24 which serves to actuate the outward pressing movement of the mandrel members 12 and 12'. The mandrel actuation pressure bag 24 may be made in the manner disclosed in co-pending application Number 255,998 filed Feb. 4, 1963, by Winston E. Brownlee and Jack L. Ritchey, by overlapping plies of resin-preimpregnated sheets of glass fiber cloth material, cured to form an inflatably dilatable bag.

The flat pressure bag 24 has its one outer bag surface adhered to the inner side 14 of the upper mandrel member 12 and its other outer surface adhered to the inner side 14' of the lower mandrel member 12'. Thus, the upper and lower mandrel members 12 and 12' are spacedly connected by the pressure bag 24 and may be actuated for movements toward and away from each other by its evacuation and inflation. One end of the pressure bag 24 extends beyond the mandrel members 12 and 12' so that it may be inflated and evacuated by means of a hollow stem 26 swagedly secured to and penetrating one surface of the bag (in the same manner as is illustrated in FIG. 2 for the correspondingly constructed pressure bag 30). To this stem 26 is fitted a pneumatic pressure line 28, which connects suitable pressure and evacuation sources (not shown). Forward surface bonding-pressure bags 30, 30', similar in construction to the mandrel-actuation bag 24, are adhered to the forward flat sides 18 and 18' of the upper and lower mandrel members 12 and 12' respectively. Their outermost edges 36, 36', which are presented along and adjacent to the serrated sides 16, 16' of the mandrel members 12, 12' are provided with a thick edge coating of resilient rubber-like material 38, 38', respectively. Thus the material of the resilient rubber-like edge coatings 38, 38' will conform to and apply pressure at the corner fillets provided between the aft skin forward margins $j$, $j'$ and their respective inward margins $k$, $k'$.

In operation, the outer and forward surfaces of the aft skin forward margins $j$, $j'$ and inward margins $k$, $k'$ are coated with adhesive; and the spar $b$ and afterbody of the helicopter rotor blade $a$ are fitted together as shown in FIG. 1. The expanding tool 10, which is initially deflated as shown in FIG. 2, is inserted within the cavity 11. In such deflated condition the pre-programmed clearance between the tool 10 and the members against which it will ultimately press is sufficient to permit easy insertion. The mandrel-actuation pressure bag 24 is then inflated through the pneumatic pressure line 28. Inflation of the flat pressure bag 24 causes the outer, serrated sides 16, 16' to press outwardly into fixed clamping engagement with the forward margins $j$, $j'$ of the afterbody skins $f$, $g$, and in turns holds them securely against the spar aft edges $c$, $d$. Then the forward bonding-pressure bags 30, 30' are similarly inflated through their hollow stems 32, 32' and pneumatic pressure lines 34, 34'. Such inflation of the forward bonding-pressure bags 30, 30' results in the application of bonding pressures to the rubber-base adhesive seams $l$ between the inward margins $k$, $k'$ and the shear web $e$, and also presses the rubber-like edge coatings 38, 38' resiliently within the corner fillets at the bends described. Somewhat higher pressure may be utilized in the mandrel-actuation bag 24 than in the forward bags 30, 30' to make sure that the expansion tool 10 is securely clamped within the cavity by the serrated surface portions 22, 22' of the outwardly pressing mandrels 12, 12'. By such clamping, the aft reactions from inflation of the forward bonding pressure bags 30, 30' are resisted; thus no force is exerted against the spacer channel $m$ aft of the tool nor against the afterbody filler material $h$.

Excellent clamping efficacy is achieved as between the serrated surface portions 22, 22' and the inner surfaces of the forward skin margins $j$, $j'$. Where a rubber-base adhesive is employed, as above described, there will be fairly effective clamping also as between the outer surfaces of its margins $j$, $j'$ and the inner aft edges $c$, $d$ of the spar $b$. Such rubber-base adhesives do not, when heated attendant to curing, become so fluid or slippery as to impair substantially this clamping action. If, however, an epoxy adhesive is used, its fluidity when heated may impair clamping against these spar edges, in which case a "back-up" fixture of a familiar type should be employed to exert forward pressure on the outer surface of the afterbody structure, to hold it forward during bonding. Nevertheless, the tool described will serve its useful functions of avoiding any aft reaction force against the spacer channel $m$ and the filler material $h$ aft of it.

After heat curing the adhesive seams $l$ between the elements to be bonded, the expanding tool 10 is readily removed by evacuating the pressure bags 24, 30 and 30'. Such evacuation in essence contracts the tool cross-section to provide sufficient clearance for its removal.

Obviously, many modifications and variations of the present invention are possible in view of the above teachings. Further, the invention is capable of use with many other types of products than the rotor blade shown in the foregoing example. It is therefore to be understood that, within the scope of the appended claims, the invention may be practiced otherwise than as specifically described.

I claim:
1. An expanding tool for applying internal pressures, comprising
   two adjacent rigid mandrel members having gripping surface portions disposed on their outwardly presented sides,
   an inflatably dilatable flat pressure bag between and spacedly connecting said mandrel members and having one outer bag surface adhered to an inwardly presented side of one of said mandrel members and having its opposite outer bag surface adhered to an inwardly presented side of the other of said mandrel members,
   characterized in having
   second and third inflatably dilatable pressure bags, each adhered to a surface of one of said mandrel members intermediate its side connected by the first pressure bag and the side having said gripping surface portions,
   said second and third pressure bags having means for inflating said bags independent of said connecting pressure bag disposed between said mandrel members,
   whereby pressures, independent of those afforded by pressing said mandrel members outwardly, may be developed and applied by said second and third pressure bags.

2. An expanding tool as defined in claim 1, wherein
   the said second and third pressure bags have outermost edges along and adjacent to said sides having said gripping surface portions,
   together with
   an edge coating of resilient rubber-like material along said edges.

3. An expanding tool for applying internal pressures, comprising
   two longitudinally-extending rigid mandrel members having fixed cross-section dimensions, a first inflatably dilatable tape-like pressure bag spacedly connecting said mandrel members and having one surface adhered to a side of one of said mandrel members and its opposite surface adhered to a side of the other of said mandrel members, and second and third inflatably dilatable tape-like pressure bags, each adhered to one of said mandrel members and the other adhered to the other said mandrel members, said second and third pressure bags having means for inflating said bags independent of said connecting pressure bag disposed between said mandrel members, and said mandrel members each including serrated surface portions disposed on their sides opposite said connecting pressure bag.

References Cited

UNITED STATES PATENTS

| | | | |
|---|---|---|---|
| 2,778,865 | 1/1957 | Kongsgaarden | |
| 2,993,270 | 7/1961 | Broman | 269—48.1 X |
| 3,025,072 | 3/1962 | Cahill | 279—4 |
| 3,087,512 | 4/1963 | Hickman | 269—48.1 X |

ROBERT C. RIORDON, *Primary Examiner.*

J. F. McKEOWN, *Assistant Examiner.*